C. A. MEZGER.
SPARK PLUG.
APPLICATION FILED SEPT. 20, 1912.

1,134,345.

Patented Apr. 6, 1915.

Witnesses:

Charles A. Mezger,
Inventor
By his Attorney
Owen & Edwards.

UNITED STATES PATENT OFFICE.

CHARLES A. MEZGER, OF NEW YORK, N. Y.

SPARK-PLUG.

1,134,345.  Specification of Letters Patent.  Patented Apr. 6, 1915.

Application filed September 20, 1912. Serial No. 721,491.

*To all whom it may concern:*

Be it known that I, CHARLES A. MEZGER, a citizen of the United States, and a resident of the city of New York, borough of Brooklyn, county of Kings, and State of New York, have invented a new and useful Improvement in Spark-Plugs, of which the following is a full, clear, and exact description.

My invention relates to a packing for making a pressure tight joint between the porcelain or insulation and the body or shell of the spark plug or jump spark igniter used in gasolene and other internal combustion engines.

The accompanying drawings show the preferred, practical embodiment of the invention.

Figure 1:
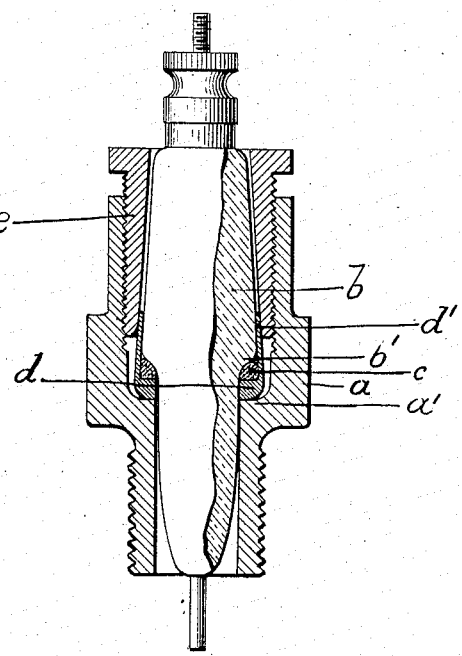
Figure 2:

In these drawings—Figure 1 is a longitudinal section of the plug fitted with my improvement and Fig. 2 is an enlarged section of the cup and gasket.

In Fig. 1, $a$ is the body of the plug which incloses the porcelain, $b$, the two respectively having opposing shoulders $a^1$ and $b^1$, between which the packing is located and adapted to be effective.

The packing comprises a gasket, $c$, of asbestos or other fibrous substance, and a ring, $d$, the two lying against each other and respectively engaging the shoulder $b^1$ of the porcelain and the shoulder $a^1$ of the body. The ring $d$ has an abutting surface to engage the shoulder $a^1$, and from the upper or outer side of the ring a thin skirt $d^1$ extends along the surface of the porcelain for the purpose of being received friction-tight within the gland $e$, thereby fastening the parts $b$, $c$, $d$, and $e$ together and allowing them to be withdrawn as a unit from the body $a$.

The parts $c$, $d$ and $d^1$ are circular in form and when the gland is screwed home in the body, the skirt $d^1$ is wedged or driven between the gland, and the porcelain, and the gasket $c$ is crowded tightly between the ring $d$ and shoulder $b^1$. This makes an air or fluid-pressure tight joint between the ring and porcelain, while the abutting surface of the ring engaging the corresponding shoulder $a^1$ of the body makes a tight joint at that point.

This invention allows the use of a solid gasket cut from an integral piece of asbestos and the solid ring $d$ furnishes a sufficient metal mass to engage, without injury, the iron body $a$ and withstand the crushing or crumpling effect of such engagement. The ring $d$ and its skirt $d^1$ are preferably formed of an integral mass of brass or other relatively soft metal, though they may be made up of more than one piece. Further, the parts $d$ and $d^1$ are preferably of different thickness, as shown, though this is not absolutely necessary.

Having thus described my invention, what I claim is:

1. A spark plug comprising the combination with the body, porcelain and gland of a fibrous gasket to engage the porcelain, and a rigid metal ring engaging the gasket and the body and a thin skirt of metal extending from the ring upward between the outer peripheral surface of the porcelain and inner surface of the gland and pinched therebetween, whereby the gland, porcelain and ring may be removed together without disturbing their relative positions.

2. A spark plug comprising the combination with the body, porcelain and gland, of a fibrous gasket engaging a shoulder on the porcelain, a metal ring or annulus engaging the gasket and a shoulder on the body, said shoulders opposing each other, and a thin metal skirt extending from the ring upward between the outer peripheral surface of the porcelain and inner surface of the gland and pinched therebetween, whereby the gland, porcelain and ring may be removed together without disturbing their relative positions.

In testimony whereof I have signed my name to this specification in the presence of two subscribing witnesses this 31st day of August, 1912.

CHARLES A. MEZGER.

Witnesses:
 KATE ROSENBERG,
 ISAAC B. OWENS.